G. E. WAHL.
CHUCK FOR BUTTON CUTTING MACHINES.
APPLICATION FILED MAY 12, 1919.
1,348,190.
Patented Aug. 3, 1920.
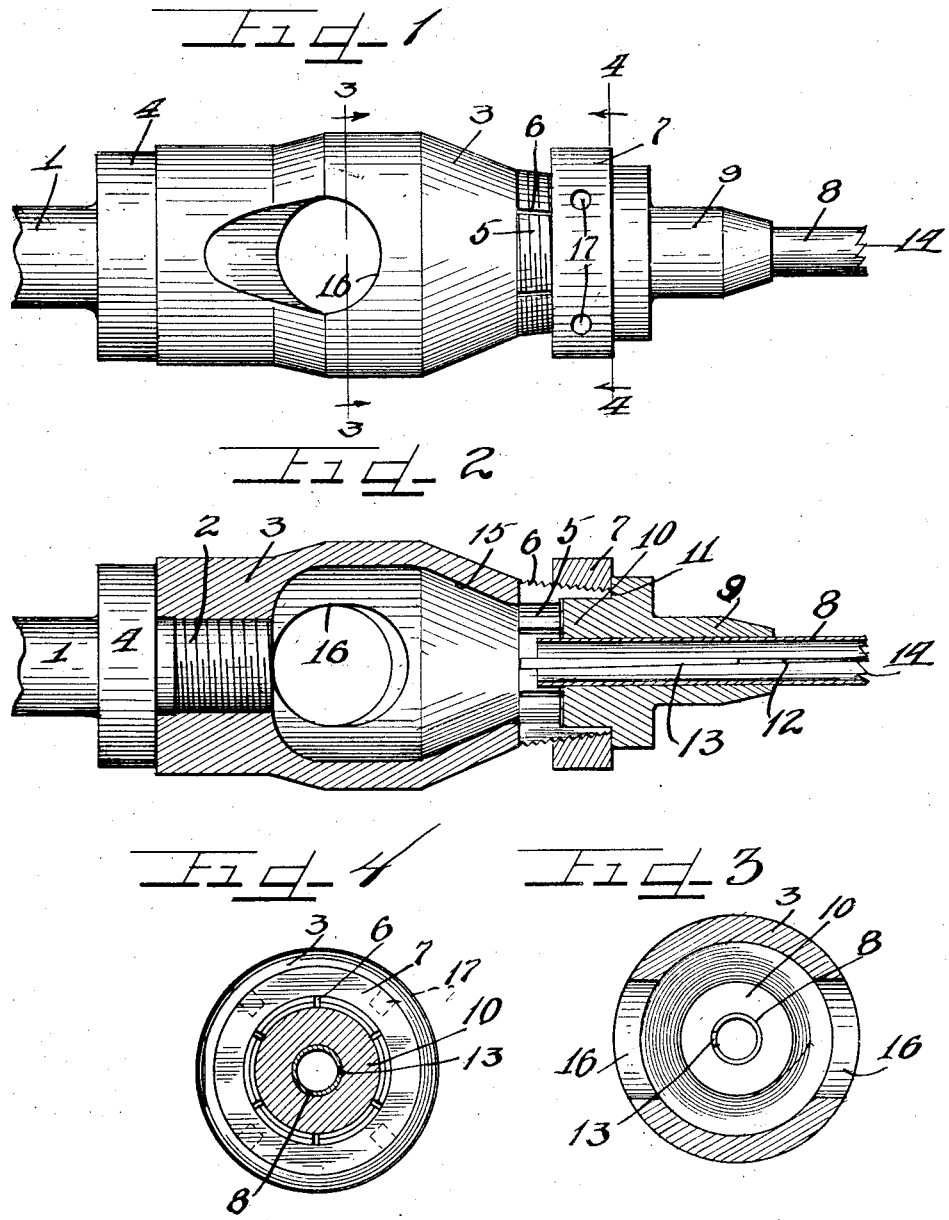

UNITED STATES PATENT OFFICE.

GEORGE E. WAHL, OF CHICAGO, ILLINOIS.

CHUCK FOR BUTTON-CUTTING MACHINES.

1,348,190.	Specification of Letters Patent.	Patented Aug. 3, 1920.

Application filed May 12, 1919. Serial No. 296,605.

*To all whom it may concern:*

Be it known that I, GEORGE E. WAHL, a citizen of the United States, and a resident of the city of Chicago, in the county of Cook and State of Illinois, have invented certain new and useful Improvements in Chucks for Button-Cutting Machines; and I do hereby declare that the following is a full, clear, and exact description of the same, reference being had to the accompanying drawings, and to the numerals of reference marked thereon, which form a part of this specification.

Heretofore in button cutting machines the tubular tool by which the disks, subsequently formed in buttons, are cut out have not been rigidly held or in many cases have not been correctly centered with the result that many undersized disks have been produced which have to be thrown away.

This has been due in large measure to the use of conical gripping surfaces between the tool and its chuck which are diffcult to form accurately and which were not trued up after the chuck had been placed in position on its spindle.

One of the principal objects, therefore, of the invention is to provide means for rigidly holding the tubular cutting tool in correct axial alinement with the axis of rotation.

A further object of the invention is to provide simple means for holding the tool in its chuck.

Other and further important objects of this invention will be apparent from the disclosures in the specification and drawings.

The invention (in a preferred form) is illustrated in the drawings and hereinafter more fully described.

On the drawings:

Figure 1 is a side elevation of a device embodying the invention.

Fig. 2 is a longitudinal section through the device.

Fig. 3 is a section on the line 3—3 of Fig. 1.

Fig. 4 is a section on the line 4—4 of Fig. 1.

As shown on the drawings:

The device comprises a spindle 1, driven and supported in any convenient manner. This spindle is provided with a threaded nose 2, on which a chuck 3, is threaded. A flange 4, on the spindle holds the chuck firmly in position and prevents lateral movement on the nose 2. The chuck is hollow and at its outer end the interior surface is made cylindrical. The end portion 5, of the chuck is slotted, as at 6, to enable the intervening metal to be pressed inwardly to grip a tool. Preferably the pressure on the end 5, of the chuck is produced by tapering and threading the outer surface of the end 5, to receive a compressing nut 7.

Within the end of the chuck is arranged a tubular cutting tool 8, centrally mounted in an adapter or holder 9. This holder is provided with a cylindrical end portion 10, adapted to slide within the end 5, of the chuck when the nut 7, is loosely mounted thereon. A shoulder 11, is formed on the holder 9 adapted to butt against the end of the chuck to take the thrust of the tool 8. After the holder has been slid into place the nut is tightened by a tool inserted in one or other of the holes 17, in its periphery to cause the chuck to grip the holder firmly.

The holder 9, is centrally apertured for the reception of the tubular cutting tool 8, which is adapted to slide thereinto. For holding the tool in place the latter is slotted as at 12, to provide a space into which a wedge 13, may be driven to expand the tool into gripping contact with its holder 8.

The end of the tool 8, is provided with cutting teeth 14, so that by pressing a sheet of material against the end of the tool a disk of the material will be cut out. Each disk as it is cut is pressed rearwardly by the next along the bore of the tool 8, and this passage of the disks is facilitated by the enlargement of the bore of the tool in its rear portions by the wedge 13. When the disks reach the end of the tool they drop into the central chamber 15, of the chuck and eventually pass out through one or other of the lateral apertures 16.

To insure perfect alinement of the tool the end of the chuck 3, is preferably trued up and the threads thereon cut after it has been placed on the spindle 1.

I am aware that numerous details of construction may be varied through a wide range without departing from the principles of this invention, and I therefore do not purpose limiting the patent granted otherwise than necessitated by the prior art.

I claim as my invention:

1. A device of the kind described comprising a chuck having a slotted end, a tubular cutting tool having a slotted end and a hollow cylindrical member adapted to slide into the said end of the chuck and over said end of the tool, means for compressing the slotted end of the chuck to grip said member, and means for expanding the tool to bring it into frictional engagement with said member.

2. A device of the kind described comprising a spindle, a centrally apertured chuck mounted on the spindle having a slotted end, said end having a cylindrical inner surface and a tapered threaded outer surface, a tubular cutting tool having a slotted end, a hollow cylindrical member adapted to slide into the end of said chuck and over said end of the tool, a nut for compressing the slotted end of the chuck to grip said member, and a wedge for expanding the tool to bring it into frictional engagement with said member, said chuck having a lateral aperture communicating with the central aperture therein to allow of the discharge of disks of material cut out by said tool.

In testimony whereof I have hereunto subscribed my name in the presence of two subscribing witnesses.

GEORGE E. WAHL.

Witnesses:
CHARLES W. HILLS, Jr.,
EARL M. HARDINE.